United States Patent
Kurz et al.

(10) Patent No.: US 7,364,333 B2
(45) Date of Patent: Apr. 29, 2008

(54) VEHICLE HEADLIGHT SYSTEM WITH VARIABLE BEAM SHAPE

(75) Inventors: Gerhard Kurz, Wendlingen (DE); Volker Oltmann, Calw (DE); Reinhold Schoeb, Gaeufelden (DE); Bernd Woltermann, Fellbach (DE)

(73) Assignee: Daimler AG, Stuttgart (DE)

( * ) Notice: Subject to any disclaimer, the term of this patent is extended or adjusted under 35 U.S.C. 154(b) by 177 days.

(21) Appl. No.: 11/184,193

(22) Filed: Jul. 19, 2005

(65) Prior Publication Data

US 2006/0039158 A1 Feb. 23, 2006

(30) Foreign Application Priority Data

Jul. 19, 2004 (DE) ............... 10 2004 034 838

(51) Int. Cl.
*B60Q 1/00* (2006.01)
(52) U.S. Cl. ............... 362/539; 362/536; 362/537; 362/530; 362/524; 362/522
(58) Field of Classification Search ............... 362/539, 362/536, 537, 530, 524, 522
See application file for complete search history.

(56) References Cited

U.S. PATENT DOCUMENTS

| | | | | |
|---|---|---|---|---|
| 4,967,319 A | * | 10/1990 | Seko | 362/466 |
| 5,673,990 A | * | 10/1997 | Neumann et al. | 362/513 |
| 5,707,129 A | * | 1/1998 | Kobayashi | 362/464 |
| 6,186,651 B1 | * | 2/2001 | Sayers et al. | 362/512 |
| 7,036,969 B2 | * | 5/2006 | Foust et al. | 362/539 |
| 2001/0040810 A1 | * | 11/2001 | Kusagaya | 362/351 |
| 2004/0228139 A1 | * | 11/2004 | Taniuchi | 362/539 |
| 2006/0151223 A1 | * | 7/2006 | Knoll | 180/169 |

FOREIGN PATENT DOCUMENTS

| | | |
|---|---|---|
| EP | 0 883 047 B1 | 9/1998 |
| FR | 2 657 681 | 8/1991 |

\* cited by examiner

*Primary Examiner*—Sandra O'Shea
*Assistant Examiner*—Jessica L McMillan
(74) *Attorney, Agent, or Firm*—Akerman Senterfitt; Stephan A. Pendorf; Yonghong Chen

(57) ABSTRACT

In a vehicle headlight system with a light source (2) and at least one reflector (1) for shaping the light emitted by the light source into a high beam and a low beam, and with a shield (7) adjustable via an actuating element (9) between a position in which the light from the light source (2) is blocked across a maximum cross section and an essentially transmissive position in which this light is substantially allowed to pass through, the actuating element (9) adapted for adjusting the shield (7) in a plurality of intermediate positions between the maximal blocking and the essentially transmissive position in which intermediate position the blocked cross section is less than the maximal cross section.

15 Claims, 1 Drawing Sheet

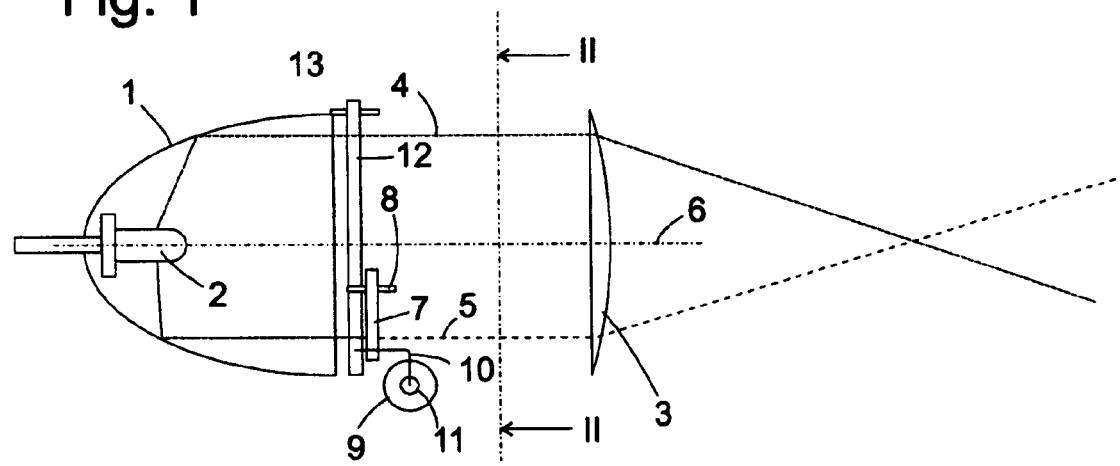
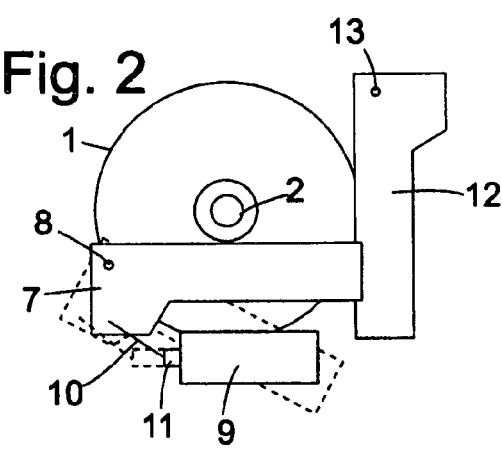
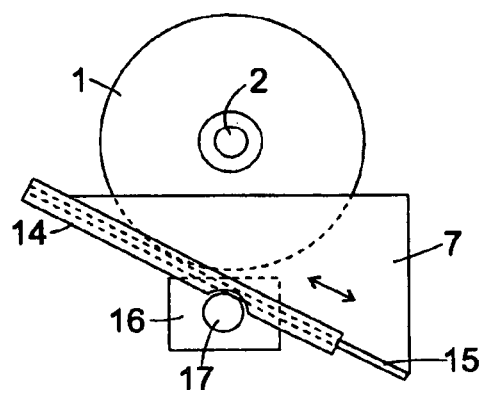

VEHICLE HEADLIGHT SYSTEM WITH VARIABLE BEAM SHAPE

BACKGROUND OF THE INVENTION

1. Field of the Invention

The invention concerns a vehicle headlight system with a light source and at least one reflector for forming the light emitted by the light source into a high beam and a low beam, and with a first shield adjustable between a position blocking the light of the light source over a maximal cross section and a position substantially allowing passage of this light via an actuating element.

2. Related Art of the Invention

A vehicle headlight system of this type is known from FR-A 2 657 681 and EP 0 863 047 B1.

These known headlight systems respectively use gas discharge lamps as light sources. In contrast to the double filament headlights previously employed for production of high and low beam lights in motor vehicles, gas discharge lamps in general have only a single cohesive light emission zone, so that a switching between high beam and low beam by change of the beam path in the headlight system is not possible. Both known headlight systems envision two discrete operating conditions, in which the part of the light emitted by the light source which forms the high beam is either transmitted or shielded in that the shield is adjusted to a position in which the light of the light source is essentially transmitted or, as the case may be, the light is blocked over its maximal cross section.

Since gas discharge lamps provide a substantially more glaring light than conventional incandescent filament lamps, a beam projection range regulation is mandated for headlight systems which have such discharge lamps, in order to prevent that, when a vehicle pitches while accelerating or changes the orientation of its body due to a load in the trunk, it produces an upward directed high beam which could blind oncoming traffic. One such beam range or amplitude control is conventionally accomplished in that the reflector of the headlight is mounted pitch-movable and is so controlled by an actuating element that the beam axis of the headlight maintains its orientation in space independent of the pitch of the vehicle. A light with a control of this type makes the headlight system comparatively bulky and expensive, since a frame or mounting must be provided about the respective reflectors, within which the reflectors are pivotably mounted, and that an actuating element must be incorporated to be effective between frame and chassis.

It is the task of the invention to provide a vehicle headlight system which, with simple and precise means, makes possible both a switching between high and low beam as well as allows the projection range of the low beam to be controlled. That means, while in the above described vehicle headlight systems there are provided only two positions of the first shield, the inventive system is allotted at least three such positions or settings, preferably an entire continuum of such positions, in which the shield can be brought.

In contrast to the above mentioned headlight systems, it is possible with the inventive system, when mounted in a vehicle, to produce not only the maximal blocking position, which represents the production of the low beam in a resting unloaded vehicle, but rather to also produce one of the intermediate positions.

SUMMARY OF THE INVENTION

In association with the invention, the headlight control for low beam and high beam no longer occurs, as has been the case until now, mechanically via an adjustment of screws, but rather by electrical actuation of shields by means of actuating elements. In connection with the invention the actuating elements of different headlights could be controlled by means of different control units, or multiple actuating elements could be controlled by a single control unit. By this electrical control the complexity of adjustment can be substantially reduced in comparison to mechanical adjustment.

In place of the conventional manner of tilting a headlight reflector backwards when the vehicle, while accelerating, pitches upwards, it is sufficient when in accordance with the present invention the shield provided for switching between high beam and low beam is moved beyond the above discussed rest position of the chassis and somewhat into the intermediate position, in order to avoid a rising high beam emission and therewith a blinding of the oncoming traffic. In contrast, when the vehicle for example during braking pitches downwards, the shield can raise the high beam however only to such an extent, that therefrom no rising light beam results, and in this manner a reduction of the illuminated area ahead of the vehicle during the pitching can be prevented.

In addition to the first shield for blocking in the vertical direction a sideways blocking second shield can be provided, in order to trim or restrict the light beam if necessary in its sideways direction. This is in particular useful when a vehicle with left hand steering, of which the headlights are conventionally so adjusted that they illuminate also the right lane markers, is adjusted in a country with left hand traffic, in order to restrict the right edge of the light cone of the headlight in the country with left hand traffic. Therein the actuation of the second shield can be adjusted manually by means of a switch, or automatically by means of a data of a navigation device, or by means of information from image providing systems.

Preferably the first shield is displaceable parallel (to the shield) or is pivotable about a beam parallel axis. This ensures that the light continuously impinges essentially with the same angle upon the shield, irregardless of how far this is inserted in the beam path. Reflections from the side of the shield impinged by the beams, as could occur with the pivoting of the shield into the beam path in the embodiment as indicated in FR 2 657 681 in which the of the shield provided with pivot axis oriented perpendicular to the beam axis, is thus avoided.

In order to lose as little as possible light output when pivoting in or sliding in the shield into the beam path, it can be useful to select as the surface of the shield facing the light source a surface having at least partially a high degree of reflection, for example by mirroring or polishing, so that the light is thrown back upon the reflector and leaves the headlight system in another way, in particular as a part of the low beam. The direction in which the light is reflected in the shield is always the same, independent of the position of the shield in the parallel displaceable or about a beam parallel axis pivotable shield, so that by a suitable construction of the headlight without more it can be ensured that the reflections therefrom do not emit in a way to pose a danger of blinding for the oncoming traffic.

One control unit for controlling the actuating elements can be incorporated with the reflector and the light into a single construction component; it can however also be incorporated separate therefrom into a different position of the vehicle, wherein in particular in the latter case preferably one control unit collectively controls the first shield of multiple reflectors.

As already indicated, the control unit can be provided in order to control or drive the actuating element of a shield in a manner correlated with a pitch position of the vehicle. For this purpose the control unit can be coupled with a sensor, which detects directly the pitch position of the vehicle, that is, by means of level sensors on the front or rear axles or with optical sensors which detect for example the distance between vehicle and roadway. There could however also be provided an acceleration sensor, from which measurement values a control unit calculates respectively the pitch angle corresponding to a measured acceleration, etc.

Alternatively or in addition the control unit can be so designed or set up, that the actuating element is controlled synchronized with the speed of the vehicle and/or with the gear selected in the manual or automatic transmission of the vehicle, or alternatively thereto, with parameters of a stepless drive (CVT-drive). One such control can in particular be used, when driving with low speed or as the case may be low gear, to suppress the high beam, even when this is enabled, for example by appropriate switch setting by the driver.

The control unit can also access, via an input, information from a navigation system, and be designed to control the actuating element on the basis of information supplied by the navigation system regarding the environment of the vehicle, in particular the course of the lane. Such information could include for example an indication regarding the fact, whether the vehicle is in the city or country, whether in the first case the high beam is shielded, even when the driver has permitted activation. The information provided by the navigation system can also provide data regarding the radius of curvature of the roadway being traveled or the imminence of a curve, wherein in a curve-rich section of road or shortly before a curve an actuating element preferably shields the high beam in such a manner in order to avoid the blinding of possible oncoming traffic not visible to the driver due to being hidden behind a curve. There is also the possibility, in the case of an imminent curve, by means of the control unit to so shield the high beam in order to direct the view of the driver towards the curve and not to illuminate unnecessarily areas lying in the distant environment behind a curve which are irrelevant to the driver.

Further, the control unit can be coupled to an image providing system such as a camera, a radar device or a lidar device, in order to acquire images of the environment of the vehicle and to control the actuating element on the basis of information supplied by the image providing system. In particular, the control unit can be so set up or arranged, in order to detect from an image supplied by the image providing system a horizon and/or a lane curve and/or the light intensity information of the environment and/or the range of visibility and/or the presence of a vehicle located in the environment, for example an oncoming vehicle, a vehicle being passed or a vehicle driving ahead, and to control the shield on the basis of this information. Thus, in the case of a low horizon relative to the vehicle based coordinate system, which is determined for example when approaching the peak or knoll of a hill, the beam can be shielded very far, in order to avoid that the headlight shines over the peak or knoll of the hill and there blinds traffic. Also in the case of detection of a road curve it can be strongly shielded or—in the case of a corresponding movabilty of the headlight system—the beam of the headlight can be sideways deflected, in order to illuminate for the driver the relevant environment areas and to leave uninteresting areas in the dark.

Since the beam formation and orientation in the vertical direction can occur by means of the movable first shield in the case of the inventive vehicle headlight system, costs can be saved if the reflector is mounted with a fixed pitch relative to the vehicle chassis.

A wide movability of the reflector on the other hand is desired, in order to be able to adapt the beam direction of the headlight to the taking of a curve.

Further characteristics and advantages of the invention can be seen from the following description of illustrative examples with reference to the attached figures.

BRIEF DESCRIPTION OF THE DRAWINGS

There is shown:
FIG. 1 The schematic vertical section along the optical axis of a headlight of the inventive headlight system;
FIG. 2 A section transverse to the optical axis along the plane II-II from FIG. 1; and
FIG. 3 A section transverse to the optical axis through the alternative embodiment of the headlight.

DETAILED DESCRIPTION OF THE INVENTION

In the schematic section of FIG. 1 one can recognize a concave, in particular parabaloid shaped reflector 1, in the focal point of which a xenon gas discharge lamp is provided as light source 2, which exhibits a coherent light emission zone for providing light for the high (distant) and low (shielded) light beam. Light emitted by the light source 2 and reflected by the reflector 1 leaves the reflector 1 as an essentially parallel beam. A bundeling lens 3 is provided in front of the reflector 1, which brings about that light beams 4, 5 emitted from the light source 2 towards upwards or, as the case may be, downwards, cross each other on opposite sides in front of the lens 3 so that in the distant field of the headlight the light beam 5 diverges or spreads out above optical axis 6 of the headlight and the light beam 4 diverges below. The light spreading out above the optical axis 6 forms a distant light beam (high beam), which has the capacity to blind oncoming traffic, while the light spreading out below the optical axis forms a low beam, which illuminates the roadway ahead of the vehicle.

Between the reflector 1 and the lens 3 a plate shaped shield 7 is mounted pivotable about an axis 8. The axis or shaft 8 is mounted in a conventional manner not shown in detail with reference to the reflector 1. An actuating element 9 provided approximately at the height of the lower edge of the reflector 1 has a horizontal movable arm 11, which is connected with the shield 7 via a hanger 10, hung up pivotably on both sides. In the position indicated with dashed lines in FIG. 1 and in FIG. 2 the arm 11 holds the shield 7 in a position, in which it substantially blocks the light emitted by the light source towards downwards. In this position the headlight shown in FIG. 1 produces a low beam.

The shield 7 which is oriented perpendicular to the optical axis 6 independent of its position can be mirrored on its side facing the reflector 1, in order to reflect back impinging light. At least one part of this light, following reflection in reflector 1, leaves this above the optical axis 6 and amplifies or intensifies therewith the low beam.

By extension of the arm 11, as indicated in dashed lines in FIG. 2, the shield 7 is lowered, so that it no longer covers the reflector or, as shown in FIG. 2, at least not over a significant circumference. This position represents the production of the high beam (long distance beam).

A second shield 12 displaceable sideways relative to the reflector 1 is mounted pivotable about an axis 13. An actuating element analogous to the actuating element 9 for pivoting the second shield 12 is omitted in the figure. When it is assumed, that the headlight system is provided primarily for employment in a country with right hand traffic, then the produced emission characteristic has an asymmetric pattern in the horizontal section, with which the right lane edge is more strongly illuminated than the oncoming traffic lane on the left side of the vehicle. When the vehicle is in a country with left traffic, the shield 12 is moved into the beam path, in order to suppress the stronger illumination of the left side, which here could lead to a blinding of oncoming traffic.

A control circuitry not shown in the figures is on the one hand connected with a sensor for detecting the pitch position of the vehicle and on the other side with an actuating element 9, in order to adapt the position of the shield 7 in stepless manner to the respective measured pitch position of the vehicle. If the vehicle is accelerated, then this leads generally to a lifting of the vehicle front part and a sinking of the trunk with a consequence that the light cone of the headlight lifts, which could lead to a blinding of oncoming traffic. The control circuit compensates the pitch movement of the vehicle in that in such a case the shield 7 is lifted approximately proportional to pitch deflection beyond the position indicated with dashed lines in FIG. 2 and thus covers over a greater part of the beam cross section. Although the reflector 1 is rigidly connected with the vehicle and its optical axis 6 therewith follows each pitch movement of the vehicle, by this control the upper edge of the high beam remains stationary with respect to the roadway, and a blinding of the oncoming traffic is avoided.

In contrast, if during braking of the vehicle this pitches in the opposite direction, the shield 7 sinks out of the position shown with dashed lines in FIG. 2, in order likewise to maintain the upper edge of the headlight cone stationary relative to the roadway and therewith to prevent a reduction of the illuminated area of the roadway, which would otherwise occur due to the downward pitch movement caused.

In accordance with further developed embodiments the control circuitry can also take into consideration diverse other parameters for controlling the position of the shield 7. Thus for example in accordance with a further development an input is provided on a control device for receiving signals, which indicates the actual gear in which the transmission of the vehicle is currently situated. This signal overrides or is superimposed on an input setting input from the driver, so that a high beam switch position set by the driver is disregarded and as necessary a low beam is set, when for example the gear is in the first gear or in a reverse gear and as a consequence thereof due to the low speed or the driving direction there is no need for a high beam. Alternatively also a direct coupling of the control circuitry to a tachometer signal or any other diverse signal correlated with the vehicle speed could be provided, so that below a predetermined vehicle speed this controls the beam setting, independent of whether the vehicle operator has selected a high beam setting. By the direct coupling of the control unit to a signal correlated with a vehicle speed there is provided also the possibility, that the direction of the light beams are adapted to the actual vehicle speed in the area or range somewhere between low beam and high beam. The course of the light beams can thereby be influenced for adjusting to discreet intermediate steps with regard to the position of the shield 7. For adjusting or setting discreet intermediate steps of the shield 7 there can be taken into consideration supplementally or alternatively also environment conditions, in particular the luminosity condition in the environment.

A different further development envisions a coupling of the control circuitry to an environment light intensity sensor, which is so provided on the vehicle, that it detects light impinging from above and only allows the high beam emission when the detected light intensity is such that it allows it to be concluded that the vehicle is moving in a dark and non-illuminated street. Thus, unnecessary or impermissible high beam light is suppressed in the day or while driving on a street illuminated with overhead lights.

In accordance with a further development a light intensity sensor is provided directed in the direction of driving or opposite to the direction of driving facing towards an adjacent road lane, which automatically suppresses the high beam when the headlight detects an oncoming or preceding vehicle or as the case may be a passing vehicle.

Further, a rain sensor or a coupling of the control unit to a windshield wiper of the vehicle can be provided, in order in the case of a rain wetted road to more strongly attenuate the light and thus for example to counteract a blinding of oncoming traffic by light reflected from the road surface.

For the reliable detection of traffic driving ahead, oncoming traffic, or passing traffic, the control circuitry can also be coupled to an image providing system such as for example a camera, a radar or a lidar system. One such image providing system is beyond this usable to detect the position of the horizon ahead of the vehicle and to so adjust the shield 7 that light is not emitted over or beyond the horizon. Thus, a blinding of the oncoming traffic is precluded also in the case of traveling over a hill. On the other hand there can, when an abnormally high horizon is detected relative to the own vehicle, it can be concluded that a valley is being passed through or that an obstacle to be driven around lies ahead of the vehicle, in both cases the control circuitry reduces the amount of the low beam or attenuation via the shield 7, so that the driver can see the same distance illuminated ahead as in the case of driving on a level road or, as the case may be, can see the ahead lying obstacle.

In accordance with another preferred further development the control circuitry is coupled to a navigation system, in order from this to receive information regarding the environment in which the vehicle is moving, thus there can be provided, for example, that when the navigation system recognizes that the vehicle is located in an urban location, that the high beam is suppressed.

One other possibility is the coupling of the control circuitry to a blinker of the vehicle and to suppress the high beam when the blinker is switched on when simultaneously the speed of the vehicle drops below a predetermined threshold value—which allows it to be concluded that the selected blinker is actually indicating and intended turn maneuver by the driver and is not indicating a lane change or a passing maneuver.

FIG. 3 shows an alternative design of the vehicle headlight system in a section transverse to the optical axis analogous to FIG. 2. Reflector 1 and light source 2 are the same as the above described embodiment. A shield 7 is mounted slidable in a rail 14. For this, the shield can have a cross section perpendicular to the plane of the figure in the shape of a T, wherein the transverse element 15 of the T engages in an undercut groove of the rail 14 and is held therein. A pinion 17 rotatingly driven by a motor 16 engages, through a cut-out, the rail 14 on a toothed rack formed on one of the cross beams 15, in order to move the shield 7 along the rail under the control of a control circuit of the above described type and thus to more or less strongly attenuate or shield the light of the light source 2.

In the above illustrative examples it was assumed that the reflector 1 is mounted rigid relative to the vehicle chassis. While the stepless movable shield 7 would make a pivot movement freedom of the reflector 1 about a horizontal axis actually unnecessary or superfluous, it could nevertheless be useful to provide a controlled pivotability of the reflector 1 about a vertical axis, in order to adapt the direction of the headlight emission to ahead-lying curves or the like. Since the person of ordinary skill in the art has knowledge of conventional headlight systems with two controlled headlight degrees of freedom he would have no difficulty to simplify such a system on a single degree of pivot freedom, thus a detailed description of the design of such a system is omitted from this section.

In a further advantageous embodiment of the invention, in the case of a malfunction of the vehicle headlight system the shields 7, 12 are respectively brought in to a position in which a blinding of other traffic participants is precluded. A malfunction can be detected for example on the basis of sensors which monitor the temperature and/or emission characteristic of the headlight system or, for example, may be determined by the driver. The control for changing the shield position preferably occurs electronically herein, may however possibly also be mechanical, for example using a spring mechanism.

The invention claimed is:

1. A vehicle headlight system comprising:
   a light source (2) having an optical axis (6);
   at least one reflector (1) for shaping the light emitted by the light source into a high beam and a low beam (4, 5);
   a first shield (7) adjustable via an actuating element (9) between a position in which the light from the light source (2) is blocked across a maximum cross section and an essentially transmissive position in which this light is substantially allowed to pass; and
   a second shield (12) displaceable sideways relative to the reflector (1);
   wherein the first shield (7) is mounted such that it is pivotable about an axis (8) and is oriented perpendicular to the optical axis (6) independent of its position;
   wherein the actuating element (9) is adapted for adjusting the first shield (7) in a plurality of continuous intermediate positions between the maximal blocking and the essentially transmissive position in which the blocked cross section is less than the maximum cross section;
   wherein the actuating clement (9) is provided approximately at the height of the lower edge of the reflector (1); and
   wherein the first shield (7) is mirrored on its inside facing the reflector (1).

2. The vehicle headlight system according to claim 1, wherein the second shield (12) is adjustable for blocking a part of the low beam or high beam on one side.

3. The vehicle headlight system, according to claim 1, a wherein the axis (8) is parallel to the optical axis (6).

4. The vehicle headlight system according to claim 1, further comprising a control unit for controlling the actuating element (9) in a manner correlated with the pitch of the vehicle.

5. The vehicle headlight system according to claim 1, further comprising a control unit for controlling the actuating element (9) in a manner correlated with the speed of the vehicle and/or with a gear selected in the transmission of the vehicle.

6. The vehicle headlight system according to claim 1, further comprising an input from a navigation system and a control unit for controlling the actuating element (9) on the basis of information supplied by the navigation system regarding the environment of the vehicle.

7. The vehicle headlight system according to claim 1, further comprising an image providing system for detecting images of the environment of the vehicle and a control unit for controlling the actuating element (9) on the basis of information supplied by the image providing system.

8. The vehicle headlight system according to claim 7, wherein the control unit is adapted to detect, in the image provided by the image providing system, a horizon and/or a road curve and/or the light intensity information from the environment and/or the range of visibility and/or a vehicle located in the environment, and to control the first shield (7) on the basis of this information.

9. The vehicle headlight system according to claim 1, wherein the light source (2) provides a contiguous light emission tone for supplying light for the high beam and the low beam.

10. The vehicle headlight system according to claim 1, wherein the light source (2) is a gas discharge lamp.

11. The vehicle headlight system according to claim 1, wherein in the case of a malfunction of the vehicle headlight system the first and second shields (7, 12) respectively are brought into a position for preventing blinding of oncoming traffic participants.

12. A vehicle with the vehicle headlight system according to claim 1, wherein a position of the first shield (7) in a resting, unloaded vehicle produces a shielded light emission which corresponds to an intermediate position.

13. A vehicle with the vehicle headlight system according to claim 1, wherein the reflector (1) is pitch-immobilized or fixed relative to vehicle chassis.

14. A vehicle with the vehicle headlight system according to claim 1, wherein the reflector (1) is freely movable relative to the vehicle chassis.

15. A vehicle headlight system comprising:
   a light source (2);
   at least one reflector (1) for shaping the light emitted by the light source into a high beam and a law beam (4,5);
   a first shield (7) adjustable via an actuating element (16) between a position in which the light from the light source (2) is blocked across a maximum cross section and an essentially transmissive position in which this light is substantially allowed to pass;
   wherein the actuating element (16) is adapted for adjusting the first shield (7) in a plurality of Continuous intermediate positions between the maximal blocking and the essentially transmissive position in which the blocked cross section is less than the maximum cross section;
   wherein the actuating element is provided approximately at the height of the lower edge of the reflector (1); and
   wherein the first shield (7) is mounted slidable on a rail (14) and is driven by the actuating element (16) to move along the rail (14).

* * * * *